(12) United States Patent
Hoche-Mong et al.

(10) Patent No.: US 8,156,199 B1
(45) Date of Patent: Apr. 10, 2012

(54) CENTRALIZED CONTROL OF CLIENT-SIDE DOMAIN NAME RESOLUTION USING VPN SERVICES

(75) Inventors: Michel Hoche-Mong, San Jose, CA (US); Steven A. Malmskog, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1471 days.

(21) Appl. No.: 11/558,722

(22) Filed: Nov. 10, 2006

(51) Int. Cl.
*G06F 15/16* (2006.01)
(52) U.S. Cl. ........ 709/218; 709/203; 709/223; 709/217; 709/224; 709/220
(58) Field of Classification Search .................. 709/203, 709/218, 223, 224, 220
See application file for complete search history.

(56) References Cited

U.S. PATENT DOCUMENTS 7,653,700 B1 * 1/2010 Bahl et al. ..................... 709/217
2009/0007241 A1 * 1/2009 Tewari et al. ..................... 726/4
* cited by examiner

*Primary Examiner* — Barbara Burgess
(74) *Attorney, Agent, or Firm* — Shumaker & Sieffert, P.A.

(57) ABSTRACT

Techniques for centrally controlling client-side domain name resolution are described. A virtual private network (VPN) client installed on a client device may establish a VPN connection to a load-balancing server that balances load from client devices among a set of data centers that provide a resource. The VPN client may obtain and cache load-balancing information from the load-balancing server. The VPN client may then intercept a Domain Name System (DNS) request to resolve a hostname of a device in the data centers. The VPN client may use the load-balancing information to locally generate a DNS response to the DNS request. In addition, the load-balancing server may cause the VPN client to update its cached list of network addresses when one of the data centers fails.

32 Claims, 4 Drawing Sheets

CENTRALIZED CONTROL OF CLIENT-SIDE DOMAIN NAME RESOLUTION USING VPN SERVICES

TECHNICAL FIELD

The invention relates to computer networks and, mores specifically, load balancing in computer networks.

BACKGROUND

When a person wishes to access a resource on a computer network, the person may enter a network identifier, e.g., a resource locator, in a software application executing on a client device. For example, if a person wished to access a certain website, the person may enter a Universal Resource Locator ("URL") into an address bar of a web browser. In general, a URL contains a domain name followed by resource specific information. For example, the URL "www.example-.com/index.html" contains the domain name "www.example-.com." A domain name does not necessarily identify a specific host device or a network address. Thus, to communicate with a host device, the client device resolves a domain name of the host device into a unique network address associated with the host device. To resolve a domain name into a network address, the client device may use the Domain Name System ("DNS").

To use a DNS, a client device may send a DNS request addressed to an external DNS server, which may be maintained by an Internet Service Provider or other organization. A DNS request is a request by a client device to resolve a domain name into a unique network address. In response to the DNS request, the DNS server may generate a DNS response that contains a list of network addresses. These network addresses may be either associated with other DNS servers or specific host devices for the domain name. If the DNS response contains the network addresses of other DNS servers, the client device may then send a DNS request to one of the DNS servers contained in the list. This DNS server may send a DNS response containing a list of network addresses of still other DNS servers. Eventually, a DNS server may respond with the network address of the specific host device.

As mentioned above, the DNS response contains a list of network addresses. By changing the order of this list, a DNS server may be able to control which network address the client device sends a request to next. Thus, by changing the order of the list for different clients, the DNS server can effectively direct the different client devices to different host devices. In this way, the DNS server can balance the processing load presented by client devices across an array of different servers, which may be geographically distributed. This process is known as Global Server Load Balancing (GSLB). This technique is often used by large enterprises to control deployment of applications across multiple data centers To save time on subsequent DNS requests, applications on a client device may store DNS responses in a local DNS cache. Thus, when the client device requests a resource using a previously resolved domain name, the client device may use the network addresses associated with the domain name in the cache rather than sending a new DNS request to a DNS server. Because conditions on the network may change, a client device may periodically purge its DNS cache. After the client device purges its DNS cache, the client device may send a new DNS request to resolve the domain name into a network address again. This may be problematic in environments that make use of GSLB since a client may be directed to a different data center each time the client refreshes its DNS cache.

SUMMARY

In general, techniques are described for centrally controlling client-side domain-name resolution. The techniques may be particularly useful in environments that utilize domain-name resolution load-balancing mechanisms, such as GSLB.

As described herein, a virtual private network (VPN) client installed on a client device is used to create a secure extranet by establishing a VPN connection to an enterprise having a plurality of data centers. A load-balancing server balances load from client devices among the data centers. The VPN client is leveraged as a mechanism by which the load-balancing server centrally manages the distribution of load from the client devices to the data centers. For example, upon establishing the secure extranet, the VPN client obtains, from the load-balancing server, load-balancing information, which includes a list of network addresses and domain names. The VPN client intercepts any Domain Name System (DNS) requests issued by applications or the operating system of the client device and, based on the stored load-balancing information, locally generates DNS responses in response to the intercepted requests. As a result, the VPN client locally issues DNS responses to any applications or the operating system in the event that applications or the operating system have flushed the client-side DNS cache. This keeps the client "attached" to the appropriate data center and keeps the client from being assigned to a different data center as a result due to DNS cache entry expiration. The central, load-balancing server directs the VPN client to update its locally-stored, load-balancing information as needed, such as when a data center fails or is otherwise unavailable.

In one embodiment, a method comprises establishing, with a secure extranet client installed on a client device, a secure extranet connection from the client device to a load-balancing server that provides load-balancing information to devices in order to balance load from client devices among a set of data centers. The method also comprises receiving, with the secure extranet client, load-balancing information from the load-balancing server, wherein the load-balancing information includes network addresses associated with the set of data centers. In addition, the method includes intercepting, with the secure extranet client, a DNS request to resolve a hostname. The method also includes generating, with the secure extranet client, a DNS response that resolves the hostname to one of the network addresses contained in the load-balancing information. In addition, the method includes forwarding the DNS response to an application on the client device.

In another embodiment, a network device comprises an application that originates DNS requests and receives DNS responses. The network device also comprises a secure extranet client. The secure extranet client comprises a tunnel creation module to establish a secure extranet connection with a load-balancing server that provides load-balancing information to devices in order to balance load from client devices among a set of data centers. The secure extranet client also includes a cache manager to receive load-balancing information from the DNS server, wherein the load-balancing information includes network addresses associated with the set of data centers. The secure extranet client also includes a DNS request module to intercept a DNS request to resolve a hostname, to generate a DNS response that resolves the hostname to one of the network addresses contained in the load-balancing information, and to forward the DNS response to the application.

In another embodiment, a system comprises a set of data centers, a set of client devices, and a load-balancing server that provides load-balancing information to devices in order to balance load from the client devices among the data centers. Each of the client devices comprises an application that originates DNS requests and receives DNS responses and a secure extranet client. The secure extranet client comprises a tunnel creation module to establish a secure extranet connection with the load-balancing server that balances load from client devices among a set of data centers. The secure extranet client also includes a cache manager to receive load-balancing information from the load-balancing server, wherein the load-balancing information includes network addresses associated with the set of data centers. The secure extranet client also includes a DNS request module to intercept a DNS request to resolve a hostname, to generate a DNS response that resolves the hostname to one of the network addresses contained in the load-balancing information, and to forward the DNS response to the application.

In another embodiment, a computer-readable medium comprises instructions. The instructions cause a programmable processor of a network device to establish, with a secure extranet client installed on a client device, a secure extranet connection from the client device to a load-balancing server that provides load-balancing information to devices in order to balance load from client devices among a set of data centers. The instructions also cause the processor to receive, with the secure extranet client, load-balancing information from the load-balancing server, wherein the load-balancing information includes network addresses associated with the set of data centers. The instructions also cause the processor to intercept, with the secure extranet client, a DNS request to resolve a hostname. In addition, the instructions cause the processor to generate, with the secure extranet client, a DNS response that resolves the hostname to one of the network addresses contained in the load-balancing information. The instructions also cause the processor to forward the DNS response to an application on the client device.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
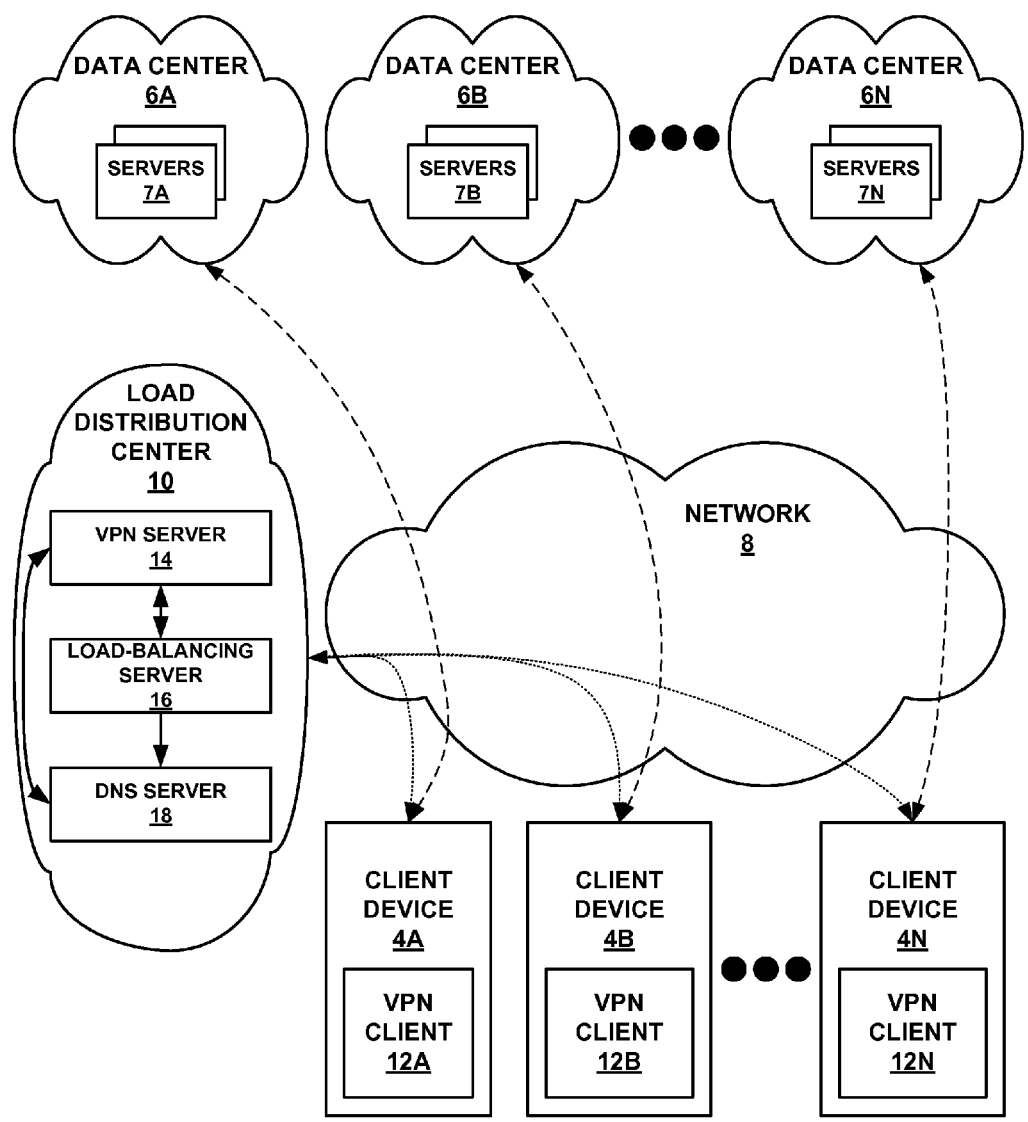
FIG. 1 is a block diagram illustrating an exemplary system that may provide centralized control of client-side domain name resolution using VPN services.

FIG. 1 is a block diagram illustrating an exemplary system 2 that may provide centralized control of client-side domain name resolution using VPN services. System 2 comprises a set of client devices 4A through 4N (collectively, client devices 4) and a set of network data centers 6A through 6N (collectively, data centers 6). In addition, a computer network 8 facilitates communication between client devices 4 and data centers 6. Network 8 may be a public network such as the Internet. Client devices 4 may be personal computers, network telephones, set top boxes, network televisions, mobile devices, intermediate network devices, gaming platform, or other network appliances.

Data centers 6 may represent geographically distributed network data centers. As illustrated in the example of FIG. 1, data centers 6A through 6N may be facilities that respectively include servers 7A through 7N to provide a resource for one or more subscribers. Subscribers may be collective entities such as enterprises and governments or individuals. For example, a network data center could house web servers for several small businesses. Other exemplary services may include data storage, virtual private networks, traffic engineering, file service, data mining, scientific- or super-computing, and so on. In some embodiments, data centers 6 may be individual network servers, network peers, or otherwise. Each of data centers 6 is generally associated with a unique network address. For example, data center 6A may be associated with the network address 125.012.012.001 and data center 6B may be associated with the network address 125.012.012.002.

To access the resource provided by data centers 6, users of client devices 4 invoke VPN clients 12A through 12N (collectively, VPN clients 12). VPN clients 12 may be software installed on respective ones of client devices 4. When the users invoke VPN clients 12, VPN clients 12 may prompt the users for a hostname of the resource. If the users enter a hostname associated with data centers 6, VPN clients 12 may establish VPN tunnels (i.e., a secure extranet connection) to a VPN server 14 in a load distribution center 10. Load distribution center 10 may be a data center like data centers 6. That is, load distribution center 10 may include a computer network having a plurality of servers and other network devices. VPN server 14 is a secure extranet appliance that facilitates secure communication between devices in load distribution center 10 and devices on network 8. In other embodiments, VPN server 14 may be another type of extranet server or appliance.

Furthermore, VPN clients 12 may prompt the users to enter authentication credentials, such as a username and password. If VPN server 14 accepts the authentication credentials, VPN clients 12 may establish VPN tunnels to VPN server 14. After one of VPN clients 12 establishes a VPN connection with VPN server 14, the VPN client may download and store load-balancing information from a load-balancing server 16 in load distribution center 10. The load-balancing information specifies which ones of data centers 6 client devices 4 should direct their network traffic. For example, the load-balancing information may include lists of network addresses that resolve hostnames. Each of the network addresses in the list may be associated with one of data centers 6 or one of servers 7 in data centers 6.

The load-balancing information may also specify one of the network addresses in a list of network addresses for a hostname as a target network address from the hostname. A target network address is a network address of the one of data centers 6 to which one of client devices 4 should direct its network traffic. By specifying different target network addresses in the load-balancing information, load-balancing server 16 may effectively balance load from client devices 4 among data centers 6. For example, load-balancing server 16 may specify a network address of data center 6A as the target network address in load-balancing information to client device 4A. Then, DNS server 18 may specify a network address of data center 6B in load-balancing information to client device 4B. As a result, client device 4A may use the network address of data center 6A to access the resource while client device 4B may use the network address of data center 6B to access the resource.

Load-balancing server 16 may send updates to VPN clients 12 after VPN clients 12 have established tunnels to VPN server 14. For example, load-balancing server 16 may monitor the status of each of data centers 6 and send updates to VPN clients 12 when a status of one of data centers 6 changes (e.g., fails, becomes non-responsive, or otherwise.) The update may contain new load-balancing information that includes a new list of network addresses associated with a hostname. In the update, load-balancing server 16 may specify a different target network address for a hostname. Furthermore, load-balancing server 16 may rebalance load from client devices 4 by sending updates to individual ones of VPN clients 12. For instance, if the performance of one of data centers 6 decreases, load-balancing server 16 may send updates to some of VPN clients 12 that use the data center. In this way, load-balancing server 16 centrally controls client-side domain name resolution using VPN services.

After VPN clients 12 download the load-balancing information, VPN clients 12 may establish VPN tunnels to the one of data centers 6. For example, VPN clients 12 may establish VPN tunnels to a secure extranet appliance of one of data centers 6 when a network address of the secure extranet appliance is the target network address for a hostname associated with secure extranet appliance of data centers 6. VPN clients 12 may automatically establish VPN tunnels to data centers 6 using authentication credentials that the users have already supplied. The ability to automatically create network tunnels to data centers 6 may reduce the frequency with which a user has to supply the authentication credentials.

When extranet software applications executing on client devices 4 initially utilize a hostname, client devices 4 may not be immediately able to resolve the hostname into a network address. To resolve the hostname into a network address, client devices 4 may generate DNS requests to a DNS server 18 in load distribution center 10. Because VPN tunnels have been established with VPN server 14 in load distribution center 10, client devices 4 deliver DNS requests to their respective VPN clients 12 for delivery to DNS server 18 via the VPN tunnel to VPN server 14.

When VPN clients 12 receive DNS requests for delivery to DNS server 18, VPN clients 12 determine whether a hostname of the DNS request matches a hostname associated with a target network address in the load-balancing information. If the hostname in a DNS request does not match a hostname associated with a network address in the load-balancing information, VPN clients 12 may forward the DNS request to DNS server 18. DNS server 18 may receive load-balancing information from load-balancing server 16. DNS server 18 may use the load-balancing information received from load-balancing server 16 when generating DNS responses to DNS requests. For example, when DNS server 18 generates a DNS response, DNS server 18 may list first a network address specified in the load-balancing information as the target network address for the requested hostname. VPN clients 12 may then incorporate the network addresses and hostname of DNS responses into their respective load balancing information and forward the DNS response to an extranet software application that originated the DNS request. Furthermore, VPN clients 12 may specify that the address listed first in the DNS response is the target network address for the requested hostname.

On the other hand, if the hostname of the DNS request matches a hostname associated with a network address in the load-balancing information, VPN clients 12 generate DNS responses that contain a network address in the load-balancing information specified as the target network address for the requested hostname. VPN clients 12 then forward the DNS responses back to the operating system or extranet software applications that originated the DNS requests. Because VPN clients 12 generate the DNS responses using the load-balancing information, the DNS responses contain the same network address as previous DNS responses, unless DNS server 18 instructed VPN clients 12 to use another network address as the target network address for the hostname. Because the DNS responses generated by VPN clients 12 contain the same network addresses as the previous DNS response, the extranet software applications continue to resolve hostnames to the same network addresses. Hence, the extranet software applications continue to communicate with the same ones of servers 7 in data centers 6.

The principles of this invention may create one or more advantages. For example, existing VPN clients on client devices may be used as a mechanism for distributing GSLB information to each client. In another example, because the VPN client maintains its own cache under the direct control of the DNS master and responds to intercepted DNS requests the VPN client may help prevent redirection to different data centers whenever applications flush their own DNS caches.

Another advantage of the invention may arise in situations where an Internet Service Provider (ISP) pools many client devices under a common network address. As a result, from the perspective of a load-balancing DNS server, the client devices are indistinguishable and appear to have the same network address. Because many client devices may appear to have the same network address, a load-balancing DNS server may be unable to determine which client device sent a DNS request. Consequently, the load-balancing DNS server may be unable to send a DNS response to a client device that contains the same list of network addresses that a previous DNS response to the client device contained. As a result, the client device may resolve the domain name to a different network address. However, under the principles of this invention, a secure extranet connection exists between client devices 4 and VPN server 14. A load-balancing DNS server may use the secure extranet connections to identify individual ones of client devices 4.

Figure 2:
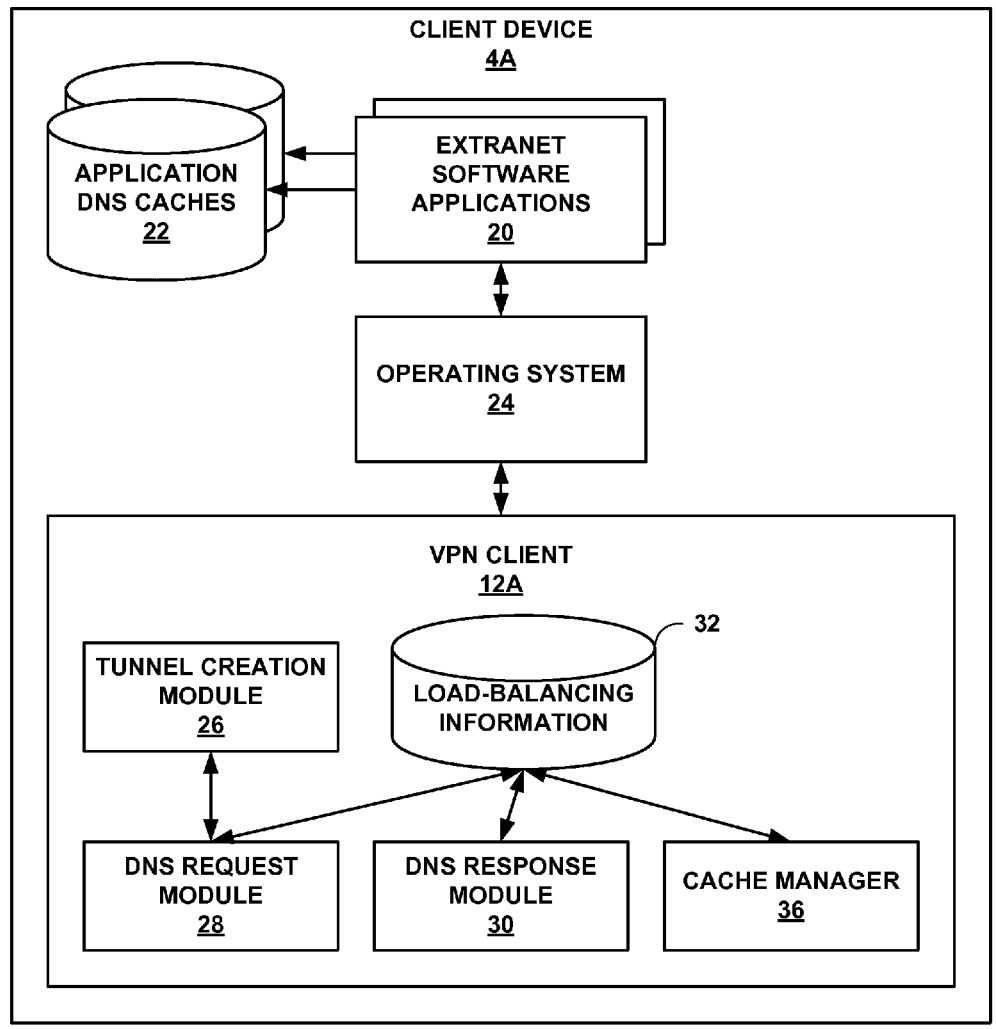
FIG. 2 is a block diagram illustrating an exemplary client device that facilitates centralized control of client-side domain name resolution using VPN services.

FIG. 2 is a block diagram illustrating an exemplary embodiment of client device 4A that facilitates centralized control of client-side domain name resolution using VPN services. As illustrated in the example of FIG. 2, client device 4A includes several components. In this example, client device 4A includes a plurality of extranet software applications 20. One of applications 20 may be a web browser such as Microsoft Internet Explorer, Apple Safari, or Mozilla Firefox. Alternatively, one of applications 20 may be a File Transfer Protocol ("FTP") client, an e-mail client such as Microsoft Outlook, or any other client-side application that acts as a DNS client.

If a user of client device 4A plans to use a resource provided by an enterprise, the user may launch VPN client 12A on client device 4A to create a secure extranet environment for communicating with data centers 6 that provide the resource. When the user launches VPN client 12A, a tunnel creation module 26 in VPN client 12A may prompt the user to provide a network address or hostname of VPN server 14. In addition, tunnel creation module 26 may prompt the user may provide one or more authentication credentials to VPN server 14. If VPN server 14 accepts the authentication credentials, tunnel creation module 26 establishes a secure extranet connection with VPN server 14. The secure extranet connection may prevent malicious attempts at injecting incorrect load balancing and/or health status information with respect to data centers 6.

After tunnel creation module 26 establishes a secure extranet connection with VPN server 14, a cache manager 36 in VPN client 12A may download load-balancing information 32 from load-balancing server 16. For example, cache manager 36 may download lists of network addresses associated with respective hostnames (e.g., domain names assigned to host devices by an enterprise) for use by extranet software applications 20. Cache manager 36 may store each of the lists in a cache or other data storage space associated with VPN client 12A.

After cache manager 36 downloads the load-balancing information, tunnel creation module 26 may automatically establish a secure extranet connection with one of data centers 6. For instance, tunnel creation module 26 may attempt to establish a secure extranet connection with a secure extranet appliance of one of data centers 6 when the network address of the secure extranet appliance has been specified as the target network address in a list of network addresses associated in the load-balancing information with a hostname associated with secure extranet appliances. In establishing the secure extranet connection to a secure extranet appliance of one of data centers 6, tunnel creation module 26 may use the same authentication credentials that tunnel creation module 26 used to establish the secure extranet connection to VPN server 14 in load distribution center 10.

Subsequently, the user of client device 4A may enter a hostname in an address bar of one of extranet software applications 20 to access a resource. To resolve the hostname into a network address, the extranet software application may first determine whether a network address exists for the hostname in one of application DNS caches 21 associated with the extranet software application. If a network address for the hostname exists in the one of application DNS caches 22 associated with the extranet software application, the extranet software application uses the network address to access the resource. On the other hand, if a network address for the hostname does not exist in the one of application DNS caches 22 associated with the extranet software application, the extranet software application may cause operating system 24 to generate a DNS request to resolve the hostname.

If the DNS request is addressed to DNS server 18, operating system 24 provides the DNS request to VPN client 12A for delivery to DNS server 18 via the secure extranet connection. However, rather than immediately delivering the DNS request to DNS server 18, a DNS request module 28 in VPN client 12A determines whether load-balancing information 32 contains a list of network addresses associated with the requested hostname.

If DNS request module 28 determines that load-balancing information 32 contains a list of network addresses associated with the requested hostname, DNS request module 28 uses the network addresses to generate a DNS response. This DNS response contains at least the network address in the list of network addresses in load-balancing information 32 that load-balancing server 16 specified as the target network address for the hostname. After generating the DNS response, DNS request module 28 forwards the DNS response to operating system 24 for ultimate delivery to application 20.

If DNS request module 28 determines that load-balancing information 32 does not contain a list of addresses associated with the requested hostname, DNS request module 28 may forward the DNS request to DNS server 18. Subsequently, VPN client 12A may receive an incoming DNS response from DNS server 18. Upon receiving the DNS response, a DNS response module 30 in VPN client 12A may incorporate a list of network addresses in the DNS response associated with the requested hostname into load-balancing information 32. DNS response module 30 may specify the first network address listed in the DNS response as the target network address for the requested hostname. DNS response module 30 may then forward a DNS response containing at least the target network address to operating system 24 for ultimate delivery to application 20. In other embodiments, if DNS request module 28 determines that load-balancing information 32 does not contain a list of addresses associated with the requested hostname, DNS request module 28 may reject the DNS request.

Load balancing server 16 may send updates to VPN client 12A via the secure extranet connection when a status of one of data centers 6 changes. For example, load-balancing server 16 may send updates to VPN client 12A periodically or when one of data centers 6 fails, becomes overloaded, and so on. Upon receiving an update from load-balancing server 16, VPN client 12A may provide the update to a cache manager 36. Cache manager 36 may then, in accordance with the update received from load-balancing server 16, update an entry in load-balancing information 32 for the hostname of data centers 6. For instance, cache manager 36 may specify a different one of the network addresses as a target network address for a hostname. In this way, the next time DNS request module 28 receives a DNS request for the hostname of data centers 6, DNS request module 26 generates a DNS response using the updated entry in load-balancing information 32. Furthermore, upon receiving an update from load-balancing server 16, tunnel creation module 26 may automatically establish a new secure extranet connection with the one of data centers 6 whose network address is specified as the target network address following the update. In this way, a user of client device 4A may not need to provide authentication credentials again when the one of data centers 6 that client device 4A was interacting with fails.

In other embodiments, when VPN client 12A receives an update from load-balancing server 16, VPN client 12A may clear load-balancing information 32. Subsequently, when DNS request module 28 receives a DNS request, DNS request module 28 forwards the DNS request module to DNS server 18. DNS response module 30 may incorporate lists of network addresses in a corresponding DNS response into load-balancing information 32 and may specify a first network address in the lists of network addresses in the DNS response as the target network addresses for the hostnames.

Figure 3:
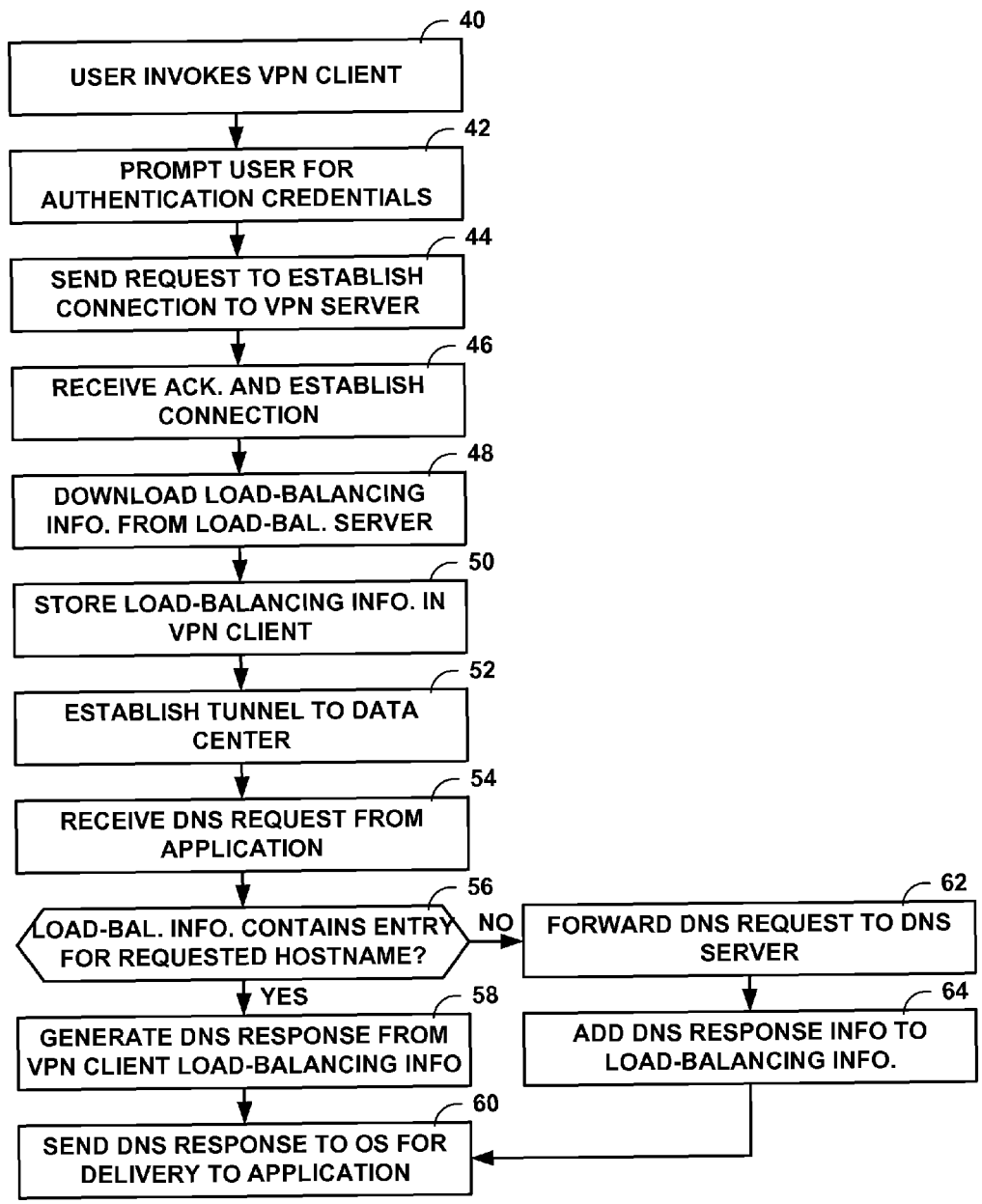
FIG. 3 is a flowchart illustrating an example operation of a VPN client.

FIG. 3 is a flowchart illustrating an example operation of VPN client 12A. Initially, a user of client device 4A invokes VPN client 12A to create a secure extranet environment for communicating with data centers 6 (40). At this time, tunnel creation module 26 may prompt the user for authentication credentials (42). After the user enters the authentication credentials, tunnel creation module 26 may send a request to VPN server 14 in load distribution center 10 to create a secure extranet connection to VPN server 14 (44). If VPN server 14 accepts the authentication credentials, tunnel creation module 26 may receive an acknowledgment from VPN server 14 and may establish a secure extranet connection with VPN server 14 (46). Cache manager 36 may then download load-balancing information from load-balancing server 16 via the secure extranet connection (48). The load-balancing information may include lists of network addresses for hostnames and may specify an address in each of the lists as a target network address for the hostnames. Cache manager 36 stores the information in load-balancing information 32 (50). After downloading the load-balancing information, tunnel creation module 26 may establish a secure extranet connection with the one of data centers 6 whose network address the load-balancing information specifies as the target network address for the hostname (52).

Subsequently, VPN client 12A may receive an outgoing DNS request from operating system 24 for delivery to DNS server 18 via the secure extranet connection (54). Upon receiving the outgoing DNS request from operating system 24, DNS request module 28 determines whether load-balancing information 32 contains a list of network addresses that resolve the hostname requested in the DNS request (56). If DNS request module 28 determines that load-balancing information 32 contains a list of network addresses that resolve the hostname requested in the DNS request ("YES" of 56), DNS request module 28 generates a DNS response using the list of network addresses that resolve the hostname in load-balancing information 32 (58). The DNS response may include the target network address in the list of network addresses in load-balancing information 32 for the hostname specified in the outgoing DNS request. DNS request module 28 may then send the DNS response to operating system 24 for delivery to the one of extranet software applications 20 that originated the DNS request (60).

On the other hand, if DNS request module 28 determines that load-balancing information 32 does not contain a list of network addresses that resolve the hostname requested in the DNS request ("NO" of 56), DNS request module 28 forward the DNS request to DNS server 18 (62). Subsequently, DNS response module 30 may add to load-balancing information 32 network addresses in a DNS response to the DNS request (64). Furthermore, because DNS server 18 may base the order of network addresses on load-balancing information received from load-balancing server 16, DNS response module 30 may specify a first one of the network addresses in the DNS response as the target network address for the requested hostname. After adding the network addresses to load-balancing information 32, DNS response module 30 may forward the DNS response to operating system 24 for delivery to one of extranet software applications 20 that originated the DNS request (60).

Figure 4:
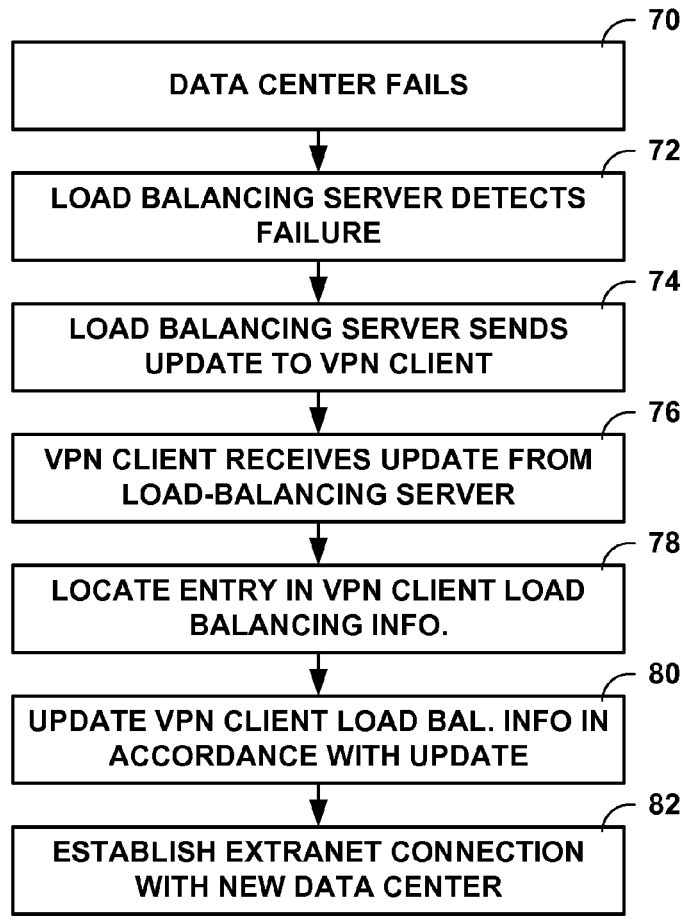
FIG. 4 is a flowchart illustrating an example operation of a system when a data center fails.

FIG. 4 is a flowchart illustrating an example operation of system 2 when one of data centers 6 fails. Initially, one of data centers 6 may fail (70). Load-balancing server 16 may detect this failure (72). When load-balancing server 16 detects the failure, load-balancing server 16 sends updates to VPN clients 12 (e.g., VPN client 12A) that have secure extranet connections with load distribution center 10 through VPN server 14 (74). For example, the updates may specify a new network address as the target address to resolve a hostname.

Subsequently, VPN client 12A may receive the update from load-balancing server 16 (76). Upon receiving the update from load-balancing server 16, cache manager 36 in VPN client 12A locates lists of network addresses in load-balancing information 32 associated with data centers 6 (78). Cache manager 36 may then update the lists in accordance with the update from DNS server 18 (80). For instance, cache manager 36 may update the lists to remove a network address, remove an entire list of network addresses for a host name, or specify a new network address in a list of network address for a hostname as the target network address for the hostname. In addition, tunnel creation module 26 may establish a new secure extranet connection with the one of data centers 6 that is associated with a new target network address (82).

Various embodiments of the invention have been described. These and other embodiments are within the scope of the following claims.

The invention claimed is:

1. A method comprising:
    establishing, with a secure extranet client installed on a client device, a secure extranet connection from the client device to a load-balancing server that provides load-balancing information to devices in order to balance load from client devices among a set of data centers;
    receiving, with the secure extranet client, load-balancing information from the load-balancing server, wherein the load-balancing information includes network addresses associated with the set of data centers;
    intercepting, with the secure extranet client, a Domain Name System (DNS) request to resolve a hostname;
    generating, with the secure extranet client, a DNS response that resolves the hostname to one of the network addresses contained in the load-balancing information; and
    forwarding the DNS response to an application on the client device.

2. The method of claim 1, further comprising:
    receiving, with the secure extranet client, an update from the load-balancing server via the secure extranet connection; and
    updating the cached list of network addresses associated with the domain name in accordance with the update.

3. The method of claim 1, further comprising establishing a secure extranet connection from the client device to a data center in the set of data centers.

4. The method of claim 3, further comprising accessing a resource via the secure extranet connection from the client device to the data center.

5. The method of claim 3, wherein establishing a secure extranet connection comprises automatically establishing a secure extranet connection with the data center with the secure extranet client upon receiving the load-balancing information.

6. The method of claim 3, wherein establishing a secure extranet connection from the client device to a data center comprises automatically sending authentication credentials of a user of the client device to an authentication engine that handles authentication for the data center.

7. The method of claim 1, wherein establishing a secure extranet connection comprises creating a Virtual Private Network ("VPN") tunnel.

8. The method of claim 1, wherein establishing a secure extranet connection comprises prompting a user of the client device for authentication credentials.

9. The method of claim 8, wherein the authentication credentials comprise a username and a password.

10. The method of claim 1, wherein one of the data centers is a network server.

11. The method of claim 1, further comprising:
    forwarding the DNS request when a hostname requested in the DNS request is not associated with a network address in the load-balancing information;
    receiving a DNS response from a DNS server for the hostname requested in the DNS request, wherein the DNS response includes a network address associated with the requested hostname, and wherein the DNS server receives load-balancing information from the load-balancing server; and
    incorporating the network address associated with the requested hostname into the load-balancing information.

12. The method of claim 1, wherein the load-balancing server sends the update when a status of one of the data centers changes.

13. The method of claim 12, wherein the load-balancing server monitors the status of the data centers.

14. A network device comprising:
an application that originates DNS requests and receives DNS responses; and
a secure extranet client comprising:
a tunnel creation module to establish a secure extranet connection with a load-balancing server that provides load-balancing information to devices in order to balance load from client devices among a set of data centers;
a cache manager to receive load-balancing information from the DNS server, wherein the load-balancing information includes network addresses associated with the set of data centers;
a DNS request module to intercept a DNS request to resolve a hostname, to generate a DNS response that resolves the hostname to one of the network addresses contained in the load-balancing information, and to forward the DNS response to the application.

15. The network device of claim 14,
wherein the cache manager receives an update from the load-balancing server via the secure extranet connection; and
wherein the cache manager updates the cached list of network addresses associated with the domain name in accordance with the update.

16. The network device of claim 14, wherein the tunnel creation module establishes a secure extranet connection from the network device to a data center in the set of data centers.

17. The network device of claim 15, wherein the application accesses the resource via the secure extranet connection from the client device to the data center.

18. The network device of claim 15, wherein the tunnel creation module automatically establishes the secure extranet connection from the network device to the data center.

19. The network device of claim 15, wherein the tunnel creation module automatically sends authentication credentials of a user of the client device to an authentication engine that handles authentication for the data center.

20. The network device of claim 14, wherein the tunnel creation module creates a VPN tunnel.

21. The network device of claim 14, wherein the tunnel creation module prompts a user of the network device for authentication credentials when establishing the secure extranet connection to the load-balancing server.

22. The network device of claim 21, wherein the authentication credentials comprise a username and a password.

23. The network device of claim 14, wherein one of the data centers is a network server.

24. The network device of claim 14,
wherein the DNS request module forwards the DNS request when a hostname requested in the DNS request is not associated with a network address in the load-balancing information;
wherein the network device further comprises a DNS response module to receive a DNS response from a DNS server, wherein the DNS response includes a network address associated with the requested hostname, wherein the DNS server receives load-balancing information from the load-balancing server; and
wherein the cache manager incorporates the network address associated with the requested hostname into the load-balancing information.

25. The network device of claim 14, wherein the load-balancing server sends the update when a status of one of the data centers changes.

26. The network device of claim 25, wherein the load-balancing server monitors the status of the data centers.

27. A system comprising:
a set of data centers;
a set of client devices; and
a load-balancing server that provides load-balancing information to devices in order to balance load from the client devices among the data centers,
wherein each of the client devices comprises:
an application that originates DNS requests and receives DNS responses; and
a secure extranet client comprising:
a tunnel creation module to establish a secure extranet connection with the load-balancing server;
a cache manager to receive load-balancing information from the load-balancing server, wherein the load-balancing information includes network addresses associated with the set of data centers;
a DNS request module to intercept a DNS request to resolve a hostname, to generate a DNS response that resolves the hostname to one of the network addresses contained in the load-balancing information, and to forward the DNS response to the application.

28. The system of claim 27,
wherein the cache manager receives an update from the DNS server via the secure extranet connection; and
wherein the cache manager updates the cached list of network addresses associated with the domain name in accordance with the update.

29. The system of claim 27, wherein the tunnel creation module establishes a secure extranet connection from the network device to a data center in the set of data centers.

30. A non-transitory computer-readable medium comprising instructions, the instructions causing a programmable processor to:
establish, with a secure extranet client installed on a client device, a secure extranet connection from the client device to a load-balancing server that provides load-balancing information to devices in order to balance load from client devices among a set of data centers;
receive, with the secure extranet client, load-balancing information from the load-balancing server, wherein the load-balancing information includes network addresses associated with the set of data centers;
intercept, with the secure extranet client, a DNS request to resolve a hostname;
generate, with the secure extranet client, a DNS response that resolves the hostname to one of the network addresses contained in the load-balancing information; and
forward the DNS response to an application on the client device.

31. The non-transitory computer-readable medium of claim 30, wherein the instructions further cause the processor to:
receive, with the secure extranet client, an update from the load-balancing server via the secure extranet connection; and
update the cached list of network addresses associated with the domain name in accordance with the update.

32. The non-transitory computer-readable medium of claim 30, wherein the medium further comprises instructions that cause the processor to establish a secure extranet connection from the client device to a data center in the set of data centers.

* * * * *